United States Patent [19]

Varrasso

[11] 4,244,896
[45] Jan. 13, 1981

[54] METHOD FOR CONTROLLING THE SIZE OF PELLETS FORMED IN A PELLETIZER

[75] Inventor: Eugene C. Varrasso, Heath, Ohio

[73] Assignee: Owens-Corning Fiberglas Corporation, Toledo, Ohio

[21] Appl. No.: 974,418

[22] Filed: Dec. 29, 1978

[51] Int. Cl.³ ................................................ B01J 2/14
[52] U.S. Cl. .................................. 264/40.1; 264/117; 425/140; 425/145; 425/147; 425/222
[58] Field of Search ............... 264/117, 40.1; 425/140, 425/145, 147, 222

[56] References Cited

U.S. PATENT DOCUMENTS

| | | | |
|---|---|---|---|
| 3,883,281 | 5/1975 | Holley | 425/222 |
| 4,091,060 | 5/1978 | Carter | 264/40.1 |

*Primary Examiner*—Donald E. Czaja
*Assistant Examiner*—James R. Hall

*Attorney, Agent, or Firm*—Ronald C. Hudgens; Patrick P. Pacella; Joel I. Rosenblatt

[57] ABSTRACT

This invention, is an apparatus for grading pellets produced by a pelletizer from dry particulate batch material and a liquid, as for a melting furnace such as a glass furnace. The pellets are sensed by passing the pellets adjacent a graded passage. When a pellet reaches a graded passage matching its size, the pellet drops through the passage and at the same time actuates a sensor indicating a pellet of that respective size. The sensor is connected to a counting device which then can provide, through an appropriate control device, a count of over or undersized pellets or the pellet distribution. This information then can be appropriately used by the control device to control the amount of dry batch material or the amount of water introduced into the pelletizer and to maintain the pellets within a desired range.

18 Claims, 4 Drawing Figures

METHOD FOR CONTROLLING THE SIZE OF PELLETS FORMED IN A PELLETIZER

THE FIELD OF THE INVENTION

The field of this invention is pelletizing and specifically pelletizing control.

BACKGROUND OF THE INVENTION

In a furnace, efficiency is increased when the heat from the furnace is passed in heat-exchange relationship with the batch material being supplied to the melting furnace. The batch can thus be preheated to elevated temperatures to save significant amounts of energy subsequently required to melt the batch.

Preferably, the heat-softenable batch material is in the form of balls or pellets in the heat-exchange chamber through which the hot gases are passed. However, it has been discovered that the pellet size must be substantially uniform. Otherwise, pellets of varying sizes tend to nest and provide excessive restriction of the flow of the gases past the pellets in the chamber. It has also been discovered that pellet size is important in addition to uniformity. If the pellets are too small, again undue restriction to the flow of the hot gases results. If the pellets are too large, their surface-to-weight ratio is accordingly reduced and the heat transferred to them is accordingly decreased. Also, trapped moisture in the larger pellets may turn to steam and cause the pellets to explode. Specifically, it has been found that pellets of one-half inch nominal diameter with a range from three-eighths inch to five-eighths inch in diameter are the ultimate for obtaining maximum heat transfer from the hot exhaust gases to the pellets.

The pellets of the heat-softenable batch material preferably are made in a modified commercially-available pelletizer. The components of the batch are mixed together and then supplied to the pelletizer. During transportation to the pelletizer, the batch components tend to segregate so that the actual batch supplied to the pelletizer will vary, even though the final pellets produced and supplied to the melting furnace or unit average out so that the short variations are not material. However, the short variations in the batch components tend to affect the pellet-forming ability of the batch and the size of the pellets produced, other factors being constant. The feed rate of the batch to the pelletizer will also vary and thereby affect pellet forming and pellet size. Liquid, and specifically water, is also supplied to the pelletizer near the batch supply. With the batch component or quantity variation, different size pellets will result when the water quantity is held constant. However, it has been found that the water quantity, or the ratio of the batch to the water, will also affect the pellet size, with more water resulting in larger pellets and less water resulting in smaller pellets, at least in most instances.

In the prior art, considerable difficulty has been experienced with pelletizing. Specifically difficult to develop was an acceptable manner of controlling the size of the pellets produced.

The difficulty has resulted in an uneconomical operation of a pelletizer whereas an excessively large portion of the pelletizer output falls above or below acceptable size limits and must be reground for later use in the pelletizer.

One device for controlling the size of pellets produced from a rotary pelletizer is disclosed in co-pending application Ser. No. 932,244, filed Aug. 9, 1978, and assigned to the common assignee. That application discloses a system for evaluating the size of completely formed pellets by separating the pellets into sized groups and weighing each separate group.

Other devices for controlling pellet size produced in a rotary pelletizer are disclosed in copending application Ser. No. 049,865, filed June 18, 1979, which is a continuation of Ser. No. 809,595, filed June 24, 1977, now abandoned and copending application Ser. No. 095,268, filed Nov. 29, 1979, which is a continuation-in-part of Ser. No. 974,470, filed Dec. 29, 1978, now abandoned, and both applications are assigned to the common assignee, and U.S. Pat. No. 3,277,218.

However, only Ser. No. 932,244 discloses control over the size pellets produced by evaluating the finished pellet after it has been emitted from the rotary pelletizer. The other copending applications and patent disclose sensing a characteristic of the material within the pelletizer and projecting that parameter to the size of the finished pellets.

In this regard, pelletizer controls can be divided into two categories: those that control the quality of the finished pellet by evaluating some feature or characteristic within the pelletizer, and those that control the quality of the finished pellet by evaluating the pellet after it has been formed and ejected from the pelletizer.

Another copending application Ser. No. 974,456, filed Dec. 29, 1978, and assigned to the common assignee, discloses a control system for a pelletizer.

SUMMARY OF THE INVENTION

This invention provides a control system for directly grading the pelletizer output at its periphery and thereby providing a minimum length control loop and a maximum loop response by collecting and grading pelletizer output.

The pelletizer as explained above is typically a rotating drum to which dry particulate batch material and liquid are added. The dry batch material may be the ingredients for glass to be later introduced in pellet form into a glass furnace, or may be any other heat-softenable material which can be made into pellets and then introduced to a melting furnace.

It has been found in operating pelletizers, that the size of the pellet increases as the ratio of liquid to dry batch material is increased, while the size of the pellet decreases when the ratio of liquid to the dry batch material is decreased. Accordingly, a rapid and accurate indication of the finished pellet size is needed to accurately maintain the correct proportion of liquid to dry material. This invention provides a rapid loop response by collecting and grading the pellets directly at the output of the pelletizer and by simultaneously providing an output signal indicative of the size distribution. By maximizing the loop response, more accurate control over the pellet output is obtained.

More particularly by bringing the grading and sensing operation to the periphery of the pelletizer, directly at the pelletizer output, the loop delay time is reduced. Then signals correcting the amount of liquid and dry solid material introduced into the pelletizer can be more rapidly controlled and made more responsive to the grading process.

In the preferred embodiment as explained below, a portion of pellets is extracted from the pelletizer, and then graded through a variable width slot. At the occurrence of a pellet with a slot width corresponding to its size, the pellet passes through the slot and actuates a sensor.

In the operation of a control device, and particularly in a control device for a pelletizer, loop response time must be minimized to reduce the scrap or number of pellets falling outside the usable range. Pellet formation starts with the injection of the dry particulate and the liquid into the pelletizer. In most pelletizers, the process is continuous and a period of time must pass for the injected materials to be formed into pellets. Control and correction of the liquid/dry mixture must occur as soon as possible after an imbalanced mixture is placed into the pelletizer. Where the control scheme evaluates the completed pellet, then the evaluation must take place as soon as possible after the pellets are completely formed.

This invention then provides a means for extracting, grading and indicating pellet size immediately upon their completed formation and ejection from the pelletizer. The time between the insertion of an imbalanced liquid/dry mixture, the evaluation of a completed pellet, and the adjustment of that mixture to a balanced condition is accomplished in a minimum time and the loop response is maximized.

DESCRIPTION OF THE PREFERRED EMBODIMENT

The principles of the invention are now described with reference to the preferred embodiment shown in the attached drawings.

Figure 1:
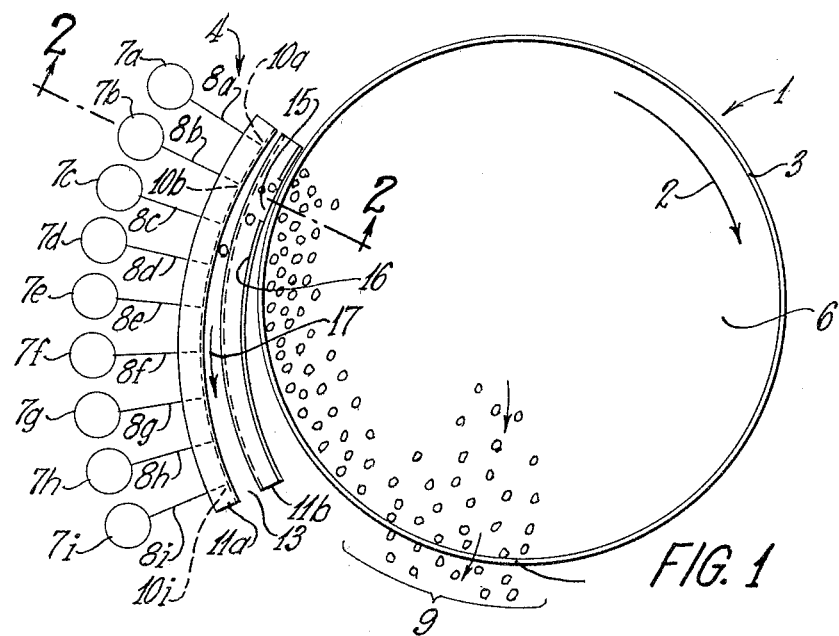
FIG. 1 is a top view of a pelletizer with the pellet grading means.

Referring now to FIG. 1, there is shown a means for producing pellets. The means as shown is a rotary pelletizer drum having a sidewall 3 and rotating in the direction of arrow 2. As is known in the pelletizer art, a rotary pelletizer is inclined, producing a level of pellets, as shown, over the surface of the drum 6. The finished pellets then spill out over sidewall 3 of the pelletizer in the region indicated by numeral 9.

Further, a means generally indicated as numeral 4 is shown for collecting and sensing the pellets directly at the output of the pelletizer. This means shown in the preferred embodiment is comprised of two sides 11a and 11b, forming a continuous slot 13 therebetween, in the direction of arrow 17. The grading and sensing device, as shown in sectional view in FIG. 2, has a slightly higher wall 16 on side 11b, with an opening 15 so that the pellets may be introduced into the sensing and grading device 4 at the end corresponding to opening 15. As the pelletizer is continuously turning, a portion of the completed pellets is swept up from area 9 to the entrance port 15. The pellets are passed along the grading means 4. In the case of the preferred embodiment, the force of gravity is used to cause the pellets to pass along the grading means, but the invention is not limited in this regard as any other force may be used as is necessary to displace the pellets accordingly; for example, air could be used. The pellets pass through the grading device in the direction of arrow 12, as shown in FIG. 2, when the size of the pellet corresponds with the size of the opening of slot 13.

Figure 2:
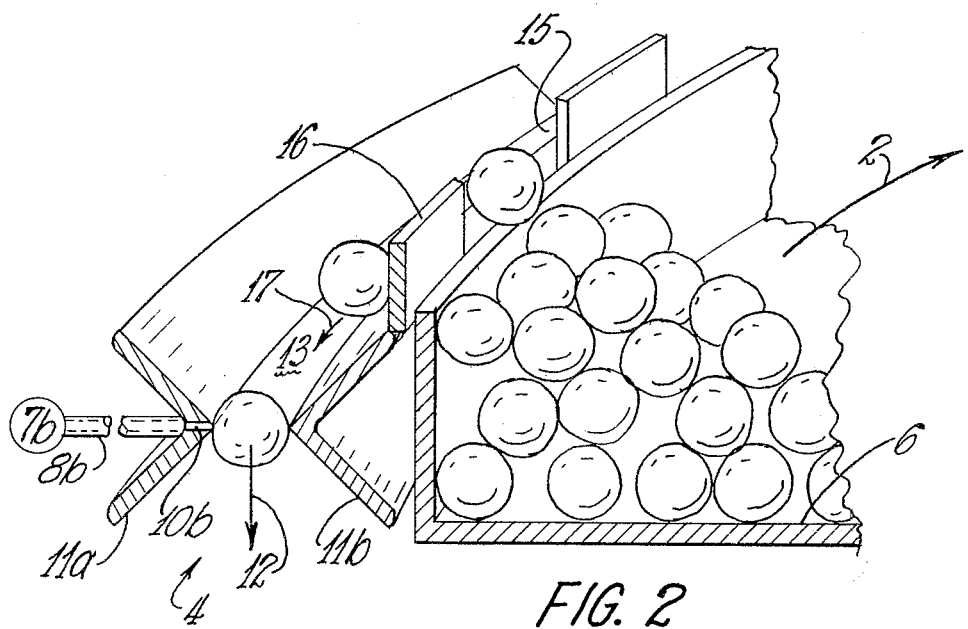
FIG. 2 is a cross-section of the pellet grading means taken across section 2—2 of FIG. 1.

A part of the total sensing device is shown in FIG. 2. As shown, a pressure switch 7b, connected to an air line 8b, for conveying air through orifice 10b into the slot, provides an indication when a match of a pellet with a correspondingly sized slot passage has occurred. In the case of the preferred embodiment, passage of the pellet through the slot would close off the air supply through orifice 10b, increasing the pressure within pressure switch 7b and causing that pressure switch to operate, producing a signal corresponding to that point and that size opening in the slot.

However, it should be noted that any other type of sensor could be used (not necessarily air), including radiation sensors (such as light), or physical sensors (such as trip switches), to sense the passage of the pellet through a respective location within the grading device and to simultaneously grade the pellet according to its size.

As shown in FIG. 1, a series of sensors 7a–7i are located along the length of the grading device, and connected to their respective orifices in the grading device through respective connecting lines. These series of sensors are as represented above by sensor 7b shown in FIG. 2. Any number of sensors can be inserted on a device commensurate with the degree of resolution desired.

The supply of air is not shown but understood to be part of the apparatus.

As shown in FIG. 1, the pellets driven up toward the entrance port 15 of the grading and sensing means by the rotation of the pelletizer as shown by arrow 2, places a supply of pellets at the said entrance port 15. The grading and sensing means, collecting the pellets directly at the output of the pelletizer, grades each pellet according to its size and simultaneously senses pellet size as it is graded.

It should be noted that the location of the means for collecting pellets, shown located approximately at the 9 o'clock position of the pelletizer, is not restrictive of the principles of the invention, as the location of the collecting means can be in any area where completed pellets become available, and is not necessarily restricted to any location the periphery of the pelletizer. For example, it can be placed in region 9, or a number of means can be placed in area 9 for grading the total output.

The pellets, once passing through the grading means, can then be collected by a suitable collecting device (not shown) and discarded or used as desired.

The grading and sensing means compares the size of the pellets by a series of graded passages, which in this embodiment is a continuous graded passage and then senses the occurrence of a pellet with a graded passage corresponding to the respective pellet size. This occurs, in the preferred embodiment, when the pellet reaches a portion of the continuous slot 13, equal to its size and passes through the slot.

Figure 3:
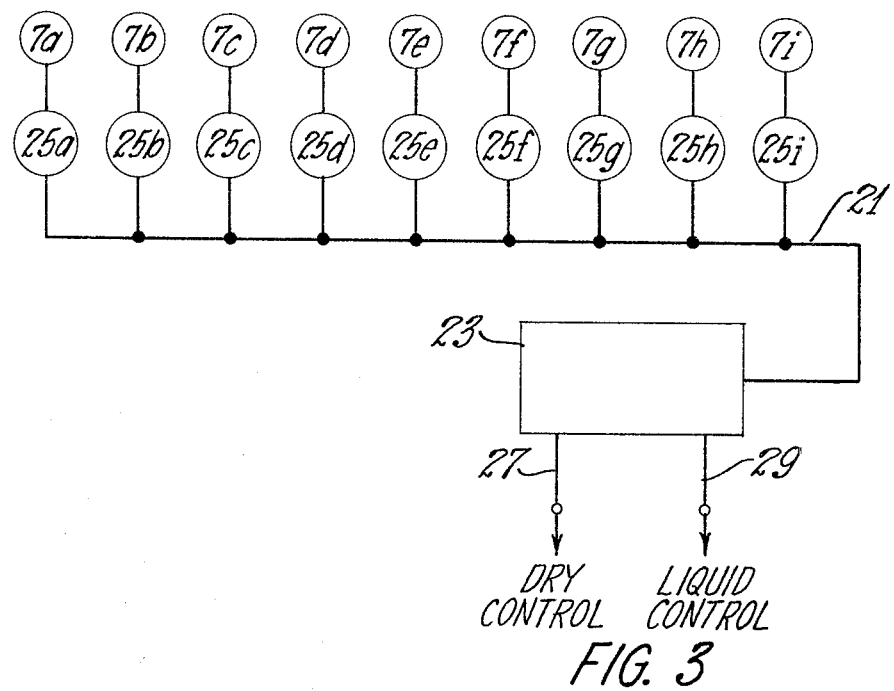
FIG. 3 is schematic of the control system for counting the pellet size distribution.

According to the principles of the invention, and as shown in FIG. 3, a means for providing a count of the pellets as they are graded and sensed is shown. The inputs from each of the sensing means 7a–7i are connected to a common bus 21 which, in turn, is connected to a control device 23. The control device may be any suitable controller receiving each of the signals, produced by the sensors and storing the signals as well as providing an indication of the count received. An example of such a device would be a Motorola 6800 which multiplexes each of the registers 25a through 25i connected to each sensor respectively, and periodically stores the count corresponding to the pellet size sensed by each respective sensor. In this case, the cycle for multiplexing each of the registers 25a through 25i should be shorter than the expected highest counting frequency. As is known in the art, the control device 23 would set each counter to zero after its count had been recorded.

The control device 23, as is known, can be arranged to respond with an output control signal 27 at the occurrence of a count in any selected one of the registers or in several selected registers, indicating either too small a pellet size, as in register 25a, or too large a pellet size, as in register 25i, or in response to any of the intermediate registers 25b through 25h corresponding to any intermediate pellet size. Additionally, according to the principles of this invention, the control device can be arranged to measure the frequency of occurrence of any particular pellet size and produce a control signal accordingly, as for example, in response to an excessive frequency of small pellets or an excessive frequency of large pellets.

Additionally, and according to the principles of this device, the controller 23 can be arranged to produce a delayed signal only after a predetermined number of small size or large size pellets have been produced.

Accordingly, responsive control signals 27 and 29 can be used separately or in conjunction to control the flow of liquid or the flow of dry batch material to the pelletizer.

Figure 4:
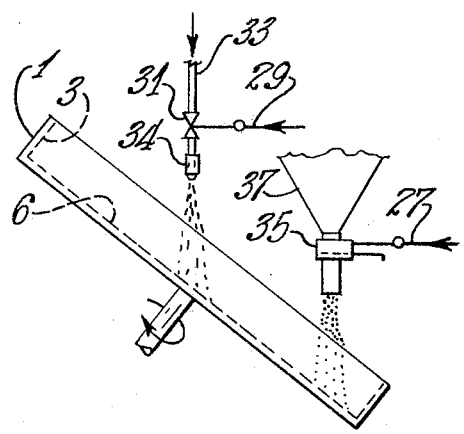
FIG. 4 is a pelletizer installation with water and dry particulate supply means.

In FIG. 4, a pelletizer installation is shown having an adjustable water valve 31, controlling the supply of water to the pelletizer through pipe 33 and outlet 34 and connected to control signal 29. Similarly, a control valve 35 placed under hopper 37, and connected to control signal 27, controls the flow of batch material into the pelletizer in accordance with a sensed count of the pellets.

I claim:

1. A method of controlling the size of pellets produced in a pelletizer in which liquid and particulate batch material are supplied to a slanted, rotating surface of said pelletizer whereby said particulate batch material is formed into pellets, said method comprising the steps of: (a) collecting at least a portion of the pellets produced by said pelletizer; (b) guiding the movement of said collected pellets; (c) determining the size of said collected pellets, as the movement of said collected pellets is being guided, by comparing the size of each of said collected pellets with a plurality of graded standards; and (d) varying the ratio of the rate of liquid supply to the rate of particulate batch material supply in response to the determined size, thereby controlling the size of the pellets produced in said pelletizer.

2. A method as recited in claim 1, wherein said determining step comprises determining the number of collected pellets that are smaller than a first predetermined size and determining the number of collected pellets that are larger than a second predetermined size.

3. A method as recited in claim 2, wherein said varying step comprises increasing the ratio of the rate of liquid supply to the rate of particulate batch material supply when a predetermined number of said collected pellets are smaller than said first predetermined size and decreasing the ratio of the rate of liquid supply to the rate of particulate batch material supply when a predetermined number of said collected pellets are larger than said second predetermined size.

4. A method as recited in claim 1 or 3, wherein said guiding step comprises guiding the movement of said collected pellets along a guide means having a wall and said determining step comprises supplying a fluid under pressure to a plurality of orifices in said wall of said guide means and sensing a change in the pressure of said fluid in said orifices.

5. A method as recited in claim 1, wherein said collecting step comprises collecting said pellets at a discharge point on the periphery of said pelletizer.

6. A method as recited in claim 1, wherein said determining step comprises counting the number of collected pellets that are smaller than a first predetermined size and counting the number of pellets that are larger than a second predetermined size.

7. A method as recited in claim 1, wherein said determining step comprises determining the number of pellets corresponding with each graded standard and calculating the frequency of collected pellets that are smaller than a first predetermined size and calculating the frequency of collected pellets that are larger than a second predetermined size, said varying step comprising increasing the ratio of the rate of liquid supply to the rate of particulate batch material supply when the frequency of collected pellets that are smaller than a first predetermined size is greater than a first predetermined frequency and decreasing the ratio of the rate of liquid supply to the rate of particulate batch material supply when the frequency of collected pellets that are larger than a second predetermined size is greater than a second predetermined frequency.

8. An apparatus for controlling the size of pellets produced in a pelletizer in which liquid and particulate batch material are supplied to a slanted, rotating surface of said pelletizer whereby said particulate batch material is formed into pellets, said apparatus comprising: (a) means for collecting at least a portion of the pellets produced by said pelletizer; (b) means for guiding the movement of said collected pellets, said guiding means being associated with said collecting means; (c) means for comparing the size of each of said collected pellets with a plurality of graded standards, as the movement of said pellets is being guided by said guiding means, to determine the size of said collected pellets; and (d) means for varying the ratio of the rate of liquid supply to the rate of particulate batch material supply in response to the size determined by said comparing means, thereby controlling the size of the pellets produced in said pelletizer.

9. An apparatus as recited in claim 8, wherein said pelletizer has a peripheral side wall and said collecting means comprises a wall which is higher than said peripheral sidewall of said pelletizer and is located adjacent said peripheral sidewall, said wall having an aperture therein that is larger than said pellets produced in said pelletizer.

10. An apparatus as recited in claim 8, wherein said collecting means is located at a point at which finished pellets are discharged from said pelletizer.

11. An apparatus as recited in claim 10, wherein said aperture of said collecting means is located approximately at the 9 o'clock position of said peripheral sidewall of said pelletizer, with the highest point of said peripheral sidewall being the 12 o'clock position.

12. An apparatus as recited in claim 8 or 9, wherein said guiding means comprises an inclined passage having two sides which form a slot therebetween, said slot being of variable width with the narrowest portion thereof being located closest to said collection means.

13. An apparatus as recited in claim 12, wherein said comparing means comprises: a plurality of apertures in one of said sides of said passage; means for providing a supply of fluid under pressure to said apertures; and means to sense a change in the fluid pressure in said apertures.

14. An apparatus as recited in claim 13, wherein said apertures in one of said sides of said passage are located such that a respective aperture is obstructed only when a pellet, having a size that is equal to the width of said slot at the point at which said respective aperture is located, passes through said slot between said sides.

15. An apparatus as recited in claim 8, wherein said graded standards comprise a series of different sized passages positioned adjacent each other.

16. An apparatus as recited in claim 8, further comprising means associated with said comparing means for indicating the correspondence of a pellet with a graded standard and means associated with said indicating means for counting the number of said collected pellets that are smaller than a first predetermined size and for counting the number of said collected pellets that are larger than a second predetermined size.

17. An apparatus as recited in claim 16, wherein said varying means is responsive to said counting means and increases the ratio of the rate of liquid supply to the rate of particulate batch material supply when said counting means indicates that a predetermined number of pellets are smaller than a first predetermined size and decreases the ratio of the rate of liquid supply to the rate of particulate batch material supply when said counting means indicates that a predetermined number of pellets are larger than a second predetermined size.

18. An apparatus as recited in claim 8, further comprising means associated with said comparing means for indicating the number of pellets corresponding with each graded standard; means responsive to said indicating means for determining the frequency of collected pellets that are smaller than a first predetermined size during a first predetermined time period and determining the frequency of collected pellets that are smaller than a second predetermined size during a second predetermined time period, said means for varying being responsive to said frequency determining means for varying the ratio of the rate of supply of liquid to the rate of supply of particulate batch material when the frequency of pellets that are smaller than a first predetermined size or pellets larger than a second predetermined size exceeds a predetermined frequency.

* * * * *